Figure 3:
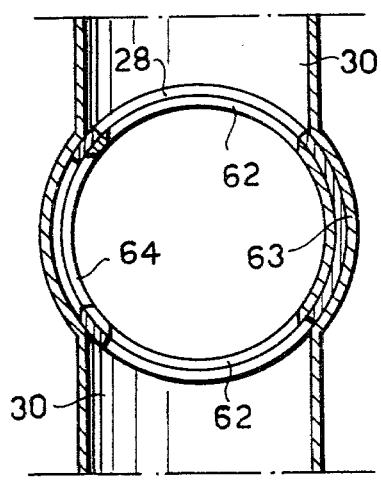

United States Patent [19]

Rivetti et al.

[11] 4,249,512
[45] Feb. 10, 1981

[54] SOLAR AIR AND WATER HEATER

[75] Inventors: Enrico Rivetti, Turin; Filippo Audisio, Cambiano, both of Italy

[73] Assignee: Centro Ricerche Fiat S.p.A., Turin, Italy

[21] Appl. No.: 50,285

[22] Filed: Jun. 20, 1979

[51] Int. Cl.³ .................................................. F24J 3/02
[52] U.S. Cl. ..................................... 126/435; 126/429; 126/437
[58] Field of Search ............... 126/428, 429, 430, 431, 126/432, 435, 437, 427, 421, 450

[56] References Cited

U.S. PATENT DOCUMENTS

| 2,553,073 | 5/1951 | Barnett | 126/437 |
|---|---|---|---|
| 3,250,269 | 5/1966 | Sherock | 126/429 |
| 3,946,721 | 3/1976 | Keyes et al. | 126/436 |
| 4,029,081 | 6/1977 | Strong | 126/429 |
| 4,060,195 | 11/1977 | Rapp, Jr. et al. | 126/427 |
| 4,076,025 | 2/1978 | Parker | 126/435 |
| 4,114,600 | 9/1978 | Newton | 126/436 |
| 4,126,270 | 11/1978 | Hummel | 126/428 |
| 4,129,116 | 12/1978 | Kent | 126/429 |
| 4,141,337 | 2/1979 | Bergen | 126/429 |

*Primary Examiner*—James C. Yeung
*Attorney, Agent, or Firm*—Sughrue, Rothwell, Mion, Zinn & Macpeak

[57] ABSTRACT

A solar air and water heater comprises a solar energy collector which is crossed by a forced air flow fed by an electrically driven fan. The solar energy collector has an air inlet pipe and an air outlet pipe both connected to an air flow control device which is supported by the covering lid of a container which is filled with water. The air inlet pipe and the air outlet pipe of the solar energy collector can be connected, by means of the air flow control device, either to heat exchange means disposed within the container, so as to permit to heat the water inside the container by means of the hot air coming from the solar energy collector, or to an external circuit for direct utilization of this hot air, or to the heat exchange means and to the external circuit simultaneously, so as to permit both direct and indirect utilization of this hot air.

6 Claims, 7 Drawing Figures

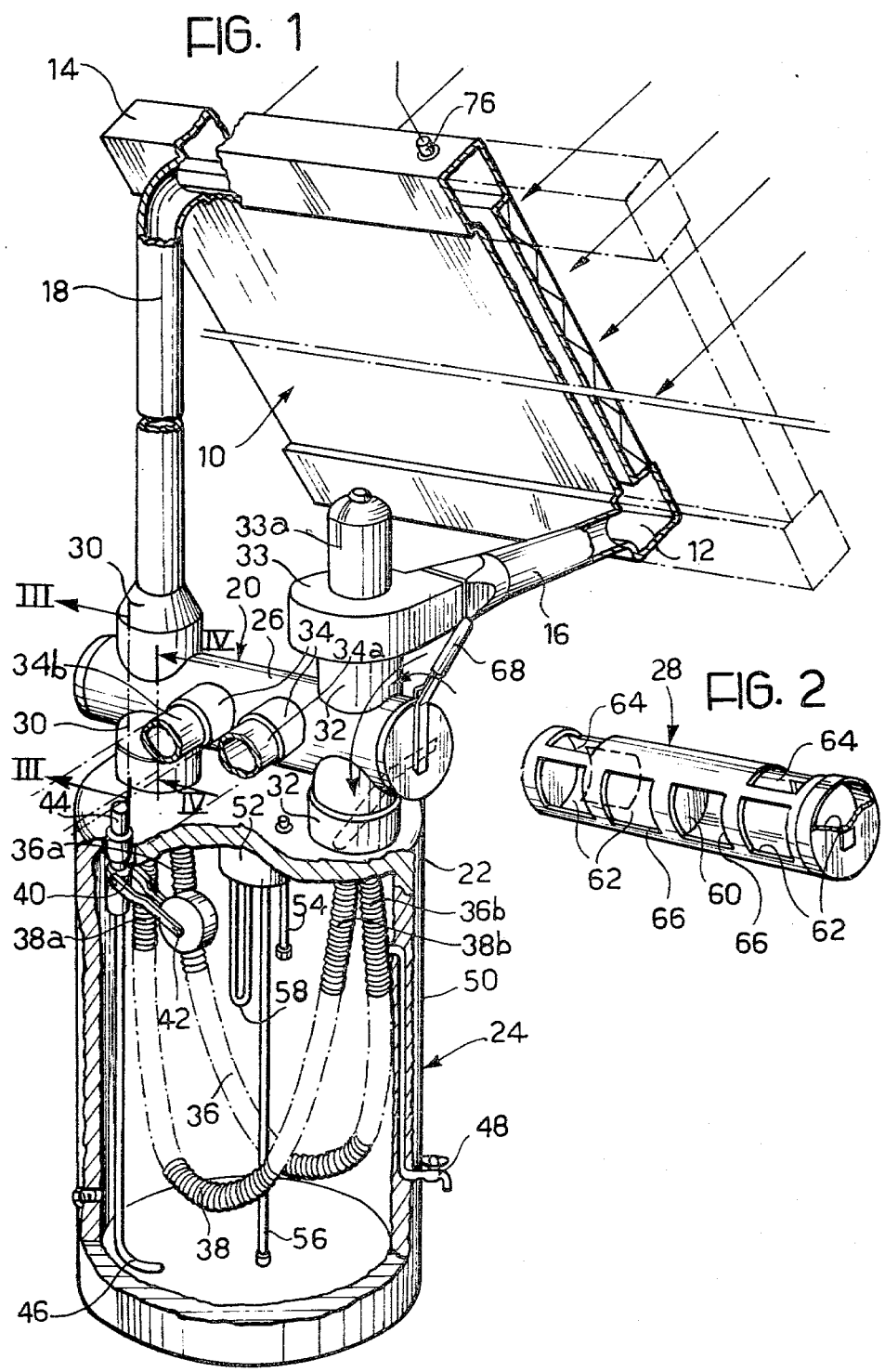

SOLAR AIR AND WATER HEATER

This invention refers to solar air and water heaters.

Various solar heat devices have been proposed in order to heat air and water simultaneously (see for example U.S. Pat. No. 3,250,269) or in order to heat water by means of previously heated air (see for example U.S. Pat. No. 2,553,073). However none of the proposed devices permits to use the air heated by solar energy both directly, e.g. for conditioning or drying purposes, and indirectly, i.e. to heat water within a container.

It is the object of the invention to provide a solar air and water heater of simple and inexpensively construction, which is capable to provide either hot air, or hot water, or hot air and hot water simultaneously. Hot air can be used, e.g., in agricultural systems to dry out seeds, aromatic herbs, mushrooms, fruits, cereals, and vegetables.

The foregoing object is achieved according to the invention by providing a solar air and water heater, characterized in that said heater comprises, in combination:

at least one solar energy collector, which is to be crossed by a forced air flow, said solar energy collector having an air inlet manifold and an air outlet manifold, a thermically isolated container provided with a covering lid, means for feeding water into a lower portion of the container and for draining water from an upper portion of the container, valve means operated by a float and disposed within said water feeding means for maintaining a predetermined level of water within said container, an air flow control device supported by said covering lid, an air inlet pipe and an air outlet pipe which respectively connect the air inlet manifold and the air outlet manifold of said solar energy collector to said air flow control device, a fan for feeding a forced air flow into said air inlet pipe, heat exchange means within said container, including air inlet means and air outlet means which are connected to said air flow control device, a main air inlet conduit and a main air outlet conduit connected to said air flow control device, distributing means within said air flow control device to connect said air inlet pipe and said air outlet pipe of the solar energy collector respectively to said air outlet means and to said air inlet means, and/or respectively to said main air inlet conduit and to said main air outlet conduit.

Figure 4:
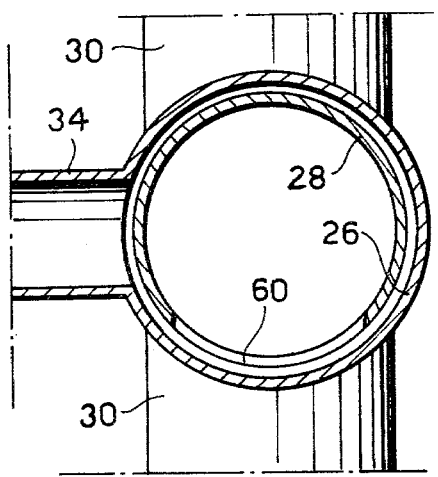
Figure 5:
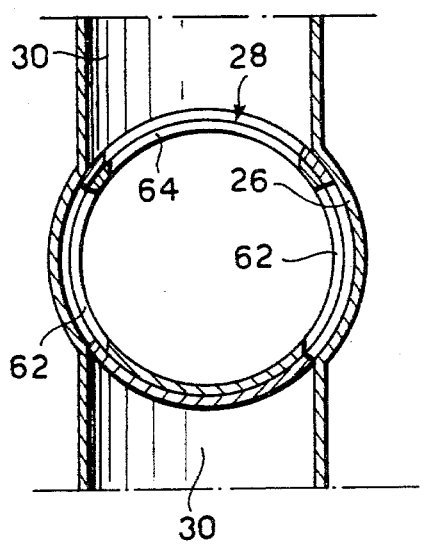
Figure 6:
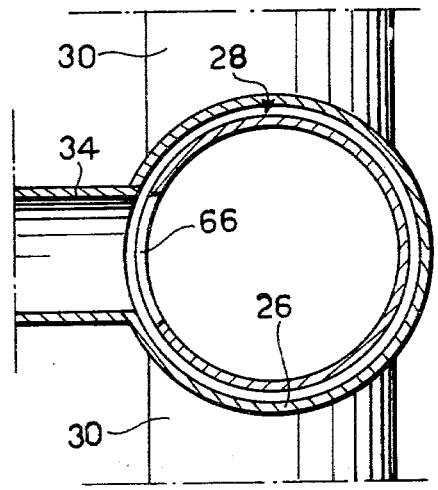
Figure 7:
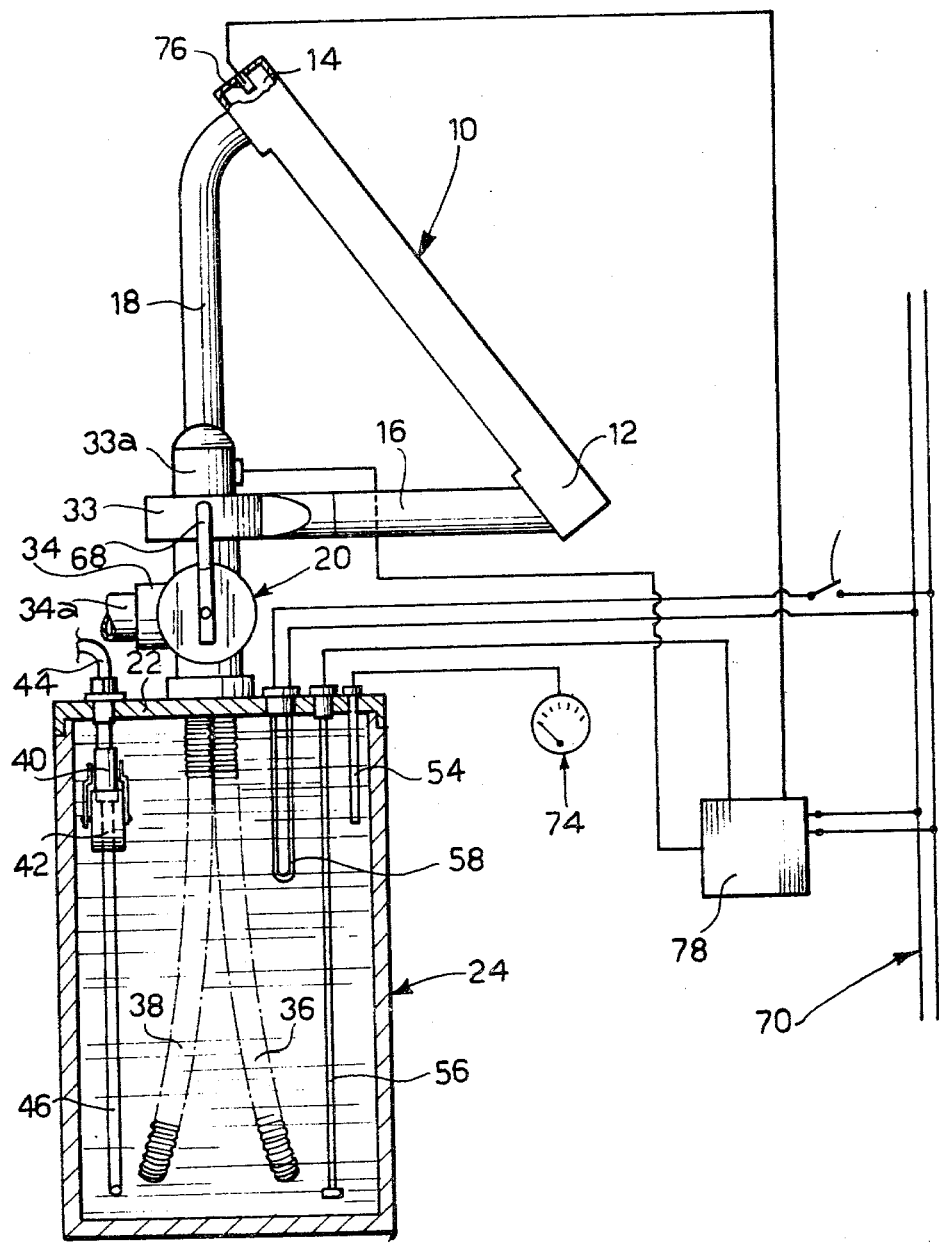

Other features and advantages of the present invention will be apparent from the following more particular description of the preferred embodiment of the invention as illustrated in the accompanying drawings, in which:

FIG. 1 is a perspective view of a solar air and water heater according to the present invention, FIG. 2 is a perspective view of the distributing means of the solar heater according to the invention, FIG. 3 is a cross-sectional view taken on line III—III of FIG. 1, showing the distributing means in a first operative position, FIG. 4 is a cross-sectional view taken on line IV—IV of FIG. 1, showing the distributing means in said first operative position, FIG. 5 is a cross-sectional view taken on line III—III of FIG. 1 showing the distributing means in a second operative position, FIG. 6 is a cross-sectional view taken on line IV—IV of FIG. 1 showing the distributing means in said second operative position, and FIG. 7 is a diagrammatic view of the solar heater according to the invention.

With reference to the drawings, the solar air and water heater according to the present invention comprises a solar energy collector 10 which is crossed by a forced air flow.

The solar energy collector 10, which is of a known type, is provided with an air inlet manifold 12 on its lower side and with an air outlet manifold 14 on its upper side.

The air inlet manifold 12 and the air outlet manifold 14 are respectively connected by means of an air inlet pipe 16 and of an air outlet pipe 18 to an air flow control device 20. The air flow control device 20 is supported by a covering lid 22 of a thermically isolated container 24. The air flow control device 20 also supports the solar energy collector 10 by means of the pipes 16, 18.

The air flow control device 20 comprises a horizontal tubular casing 26, which is closed at both of its ends, and a tubular member 28 rotatably mounted within said tubular casing 26.

The tubular casing 26 is provided at one of its ends with a couple of opposite vertical fittings 30, the upper one being connected to the air outlet pipe 18 of the solar energy collector 10. The other end of the tubular casing 26 is provided with a couple of opposite vertical fittings 32, the upper one being connected to the air inlet pipe 16 of the solar energy collector 10. A fan 33, driven by an electric motor 33a, is disposed at the upper end of the upper fitting 32 for feeding a forced air flow into the air inlet pipe 16.

The tubular casing 26 is also provided with a third couple of horizontal fittings 34 which are axially positioned between the fittings 30, 32 and which are to be connected respectively to a main air inlet conduit 34a, and to a main air outlet conduit 34b, which is used for the direct utilization of the hot air coming from the solar energy collector 10.

The lower fittings 30, 32 are connected, through the covering lid 22 of the container 24, to a couple of corrugated tubes 36, 38 for the circulation of the air coming from the solar energy collector 10 within the container 24, so as to permit a heat exchange between this air and the interior of the container 24. The tubes 36, 38 have air inlet ends 36a, 38a connected to the lower fitting 30 and air outlet ends 36b, 38b connected to the lower fitting 32.

The container 24 is to be filled with water coming, through a valve 40 operated by a float 42, from a pipe 44 which crosses the covering lid 22. The pipe 44 is connected to a water feeding source which is not shown in the drawings. The pipe 44 has an end 46 disposed within the container 24 in the vicinity of the bottom of the container, so that the water coming from said water feeding source is fed into a lower portion of the container 24.

The container 24 is also provided with a manually operable tap 48 which is connected to one end of a pipe 50. The other end of the pipe 50 is disposed in the vicinity of the covering lid 22 and within the container 24, so as to permit drainage of water from the upper portion of the container 24.

The covering lid 22 is provided on its inner side with a support member 52 which supports a couple of water temperature sensors 54, 56, respectively disposed in the upper portion and in the lower portion of the container 24, and an heating electric resistor 58.

An air temperature sensor 76 is disposed within the air outlet manifold 14 of the solar energy collector 10.

As shown in detail in FIG. 2, the tubular member 28 which is rotatably mounted within the tubular casing 26 is provided with a partition plate 60 which lies in a plane perpendicular to the axis of the tubular member 28, in an intermediate axial position between the two fittings 34. The tubular member 28 is provided with two couples of first quadrangular opposite apertures 62, which have the same axial position of the fittings 30, 32 of the tubular casing 26, with a couple of second apertures 64, which have the same axial position of the fittings 30, 32 and are angularly offset by an angle of 90 degrees with respect to the first apertures 62, and with a couple of third apertures 66 which have the same axial position of the fittings 34 of the tubular casing 26. The third apertures 66 are offset by an angle of 90 degrees with respect to the second apertures 64.

The number of reference 68 indicates an external driving lever, that may be manually operated, fixed to one end face of the tubular member 28. The driving lever 68, which may be manually moved between the position indicated by unbroken lines and the position indicated by broken lines in FIG. 1, allows, owing to the angular movement of the tubular casing 28, either the direct utilization of the hot air coming from the solar energy collector 10, or the indirect utilization of this hot air to heat the water within the container 24.

FIGS. 3 and 4 show the air control device 20 in the operative position corresponding to the raised position (unbroken lines) of the driving lever 68. In this position, the hot air coming from the air outlet manifold 14 of the solar energy collector 10 enters into the pipes 36, 38, flowing through the air outlet pipe 18, the upper fitting 30, the apertures 62 of the tubular member 28 and the lower fitting 30. In this condition, the apertures 64, 66 of the tubular member 28 are in such a position as to prevent flowing of the air through the fittings 34.

The air flowing through the pipes 36, 38 heats the water within the container 24 and returns into the air inlet manifold 12 of the solar energy collector 10 flowing through the lower fitting 32, the corresponding apertures 62 of the tubular member 28, the upper fitting 32 and the air inlet pipe 16.

When the driving lever 68 is in its lower position (indicated by broken lines) the air flow control device 20 is in the condition shown in FIGS. 5 and 6.

In this condition, the air coming from the air outlet pipe 18 enters into one of the fittings 34 flowing through the upper fitting 30 and the corresponding apertures 64 and 66 of the tubular member 28. In this case the hot water coming from the solar energy collector 10 can be used directly to heat rooms or to dry out agricultural or like products. At the same time, the air which is sucked by the fan 33 reaches the air inlet manifold 12 of the solar energy collector 10 flowing through the other fitting 34, the corresponding apertures 66 and 64 of the tubular member 28, the upper fitting 32 and the air inlet pipe 16.

The driving lever 68 may be also disposed in any intermediate position between the two above described positions, so as to allow simultaneously direct and indirect utilization of the hot air coming from the solar energy collector 10. If the solar energy is not sufficient to effectively heat the air flowing through the solar energy collector 10, tha water inside the container 24 may be heated by means of the heating electrical resistor 58. As shown in FIG. 7, the electrical resistor 58 is connected to a feeding electric network 70 by means of a switch 72. The water temperature sensor 54 is connected to an indicating instrument 74 so that it is possible to manually operate the swith 72 when the instrument 74 indicates a value of the water temperature within the container 24 which is below a predetermined water temperature value.

The water temperature sensor 56 and the air temperature sensor 76 are both connected to an electric differential thermostat 78, of a know type, which is connected to said feeding electric network 70 and to the electric motor 33a so as to cause an activation of the fan 33 only when the difference between the temperatures detected by sensors 56, 76 is above a predetermined level.

While the invention has been particularly shown and described with reference to a preferred embodiment thereof, it will be understood by those skilled in the art that various changes in form and details may be made therein without departing from the spirit and scope of the invention.

We claim:

1. A solar air and water heater comprising in combination:
    at least one solar energy collector which is to be crossed by a forced air flow, said solar energy collector having an air inlet manifold and an air outlet manifold,
    a thermically isolated container provided with a covering lid,
    means for feeding water into a lower portion of the container and for draining water from an upper portion of the container,
    valve means operated by a float and disposed within said water feeding means for maintaining a predetermined level of water within the container,
    an air flow control device supported by said covering lid,
    an air inlet pipe and an air outlet pipe which connected, respectively, the air inlet manifold and the air outlet manifold of said solar energy collector to said air flow control device, said solar energy collector being supported by said air flow control device by means of said pipes,
    an electrically driven fan for feeding a forced air flow into said air inlet pipe,
    heat exchange means within said container, including air inlet means and air outlet means which are connected to said air flow control device,
    a main air inlet conduit and a main air outlet conduit which are connected to said air flow control device,
    distributing means within said air flow control device to connect said air inlet pipe and said air outlet pipe of the solar energy collector respectively to said air outlet means and to said air inlet means and/or respectively to said main air inlet conduit and to said main outlet conduit.

2. A solar air and water heater according to claim 1, wherein the air flow control device comprises a tubular horizontal casing which is closed at its ends and is provided with a first couple of fittings, diametrically opposite each other, which are respectively connected to said air outlet pipe of the solar energy collector and to said air inlet means of the heat exchange means; a second couple of fittings, diametrically opposite each other, which are respectively connected to said air inlet pipe of the solar energy collector and to said air outlet means of the heat exchange means, and a third couple of fittings axially interposed between said first and second couple of fittings offset by an angle of 90 degrees with respect to said first and second couple of fittings and respectively connected to said main air inlet conduit and to said main air outlet conduit; said distributing means including a tubular member closed at its ends, rotatably mounted within said tubular casing and provided with a partition plate placed in an intermediate axial position between the two fittings of said third couple of fittings; said tubular member being provided with two couples of first opposite apertures having the same axial position of said first and second couple of fittings, with a couple of second apertures having the same axial position of said first apertures and offset by an angle of 90 degrees with respect to said first apertures and a couple of thirs apertures having the same axial position of said third couple of fittings and offset by an angle 90 degrees with respect to said second apertures.

3. A solar air and water heater according to claim 2, wherein said heater comprises an external driving lever that may be manually operated, connected to one end face of said tubular member.

4. A solar air and water heater according to claim 1, wherein said heater comprises a heating electric resistor within said container, which is supported by said covering lid, and connected to a feeding electric network by means of a manually operable swith, said heder also comprising a first water temperature sensor, disposed in the upper portion of the container and connected to an indicating instrument.

5. A solar air and water heater according to claim 4, wherein said heater comprises a second water temperature sensor, disposed in the lower portion of the container, and an air temperature sensor, disposed in said air outlet manifold of the solar energy collector, said second water temperature sensor and said air temperature sensor being both connected to an electric differential thermostat, which is also connected to said electric feeding network and to said electrically driven fan so as to cause an activation of said fan only when the difference between the temperatures detected by said second water temperature sensor and said air temperature sensor is above a predetermined level.

6. A solar air and water heater according to claim 2, wherein said heat exchange means comprise a couple of corrugated tubes having air inlet ends connected to a fitting of said first couple of fittings and air outlet ends connected to a fitting of said second couple of fittings.

* * * * *

UNITED STATES PATENT AND TRADEMARK OFFICE
CERTIFICATE OF CORRECTION

PATENT NO. : 4,249,512
DATED : February 10, 1981
INVENTOR(S) : Enrico RIVETTI and Filippo AUDISIO It is certified that error appears in the above-identified patent and that said Letters Patent are hereby corrected as shown below:

Please add the following priority data information on page 1 of the patent:

-- FOREIGN APPLICATION PRIORITY DATA

June 20, 1978  Italy  53426-B/78 --

Signed and Sealed this

Nineteenth Day of May 1981

[SEAL]

Attest:

RENE D. TEGTMEYER

Attesting Officer

Acting Commissioner of Patents and Trademarks